US005894696A

United States Patent [19]

Ando et al.

[11] Patent Number: 5,894,696

[45] **Date of Patent: *Apr. 20, 1999**

[54] METHOD OF AND APPARATUS FOR SUPPLYING A SOLUTION FOR RAISING OF TERRESTRIAL PLANTS

[75] Inventors: Shigeru Ando; Minehiro Kamiyama; Megumu Dohi; Osamu Yoshimoto; Tetsuro Tojo, all of Kagawa, Japan

[73] Assignee: Toyo Tanso Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,567

[22] Filed: Mar. 31, 1997

[51] Int. Cl.[6] .............................. A01B 79/00; A01C 1/00; A01G 31/00; C25B 11/00

[52] U.S. Cl. .................................. 47/58.1; 47/1.3; 47/62; 423/415.1; 204/286; 204/294

[58] Field of Search ............................... 47/62, 58.1, 1.3; 423/415.1; 204/286, 294

[56] References Cited

FOREIGN PATENT DOCUMENTS 0589705 3/1994 European Pat. Off..

*Primary Examiner*—Robert A. Wax
*Assistant Examiner*—Tekchand Saidha
*Attorney, Agent, or Firm*—Oblon, Spivak, McClelland, Maier & Neustadt, P. C.

[57] ABSTRACT

A method of efficiently supplying terrestrial plants with raising substances such as a solution comprises the steps of: producing a solution by an electrolysis of a water using a carbonaceous electrode; reducing the produced solution to minute particles or fine spray; and supplying the solution to the terrestrial plants including leaves entirely. An apparatus includes a container for storing water having at least a water inlet and a water outlet; a pair of electrodes comprising an anode and a cathode provided in the container, at least the anode being made of composition of carbonaceous materials and cured resins and molded into a plate-like form; a power supply to supply an electric current between the pair of electrodes to produce a solution by an electrolysis of the water; and a pump connected with the water outlet in the container for supplying the solution to the terrestrial plants.

15 Claims, 2 Drawing Sheets

METHOD OF AND APPARATUS FOR SUPPLYING A SOLUTION FOR RAISING OF TERRESTRIAL PLANTS

BACKGROUND OF THE INVENTION

1. Field of the Invention

The present invention relates to a method of and an apparatus for effectively supplying terrestrial plants e.g. farm products such as fruits and vegetables, planted trees and the like with a solution useful for raising of the terrestrial plants, so that a photosynthesis is activated in the terrestrial plants and the growth of the terrestrial plants can be accelerated to provide improved yield and quality of farm products and the like.

2. Description of the Prior Art

A method of and an apparatus for electrolysis of a water contained in an aquarium for ornamental fish use by using carbon electrode as an anode has been proposed in the European Patent Publication No. EPA0589705A1, wherein water plants placed in the aquarium can be supplied with carbon dioxide and the growth of the water plants in the aquarium is accelerated.

However, no equipment configuration for supplying a large amount of solution of carbon dioxide is provided by this prior art since the aquarium for keeping ornamental fish and water plants is small in capacity. In addition to this, any method of effectively supplying terrestrial plants with carbon dioxide is not suggested by this prior art since the water plants in the aquarium can be automatically supplied with carbon dioxide when the carbon dioxide is dissolved in water in the aquarium.

In the prior art for acceleration of carbon dioxide assimilation of terrestrial plants, the method of supplying carbon dioxide gas into a vinyl house or a green house has been practiced in general in order to increase concentration of carbon dioxide gas in the atmosphere of the vinyl house. In this conventional method, the carbon dioxide gas is produced by combustion of fossil fuel such as liquefied petroleum gas, heavy oil or the like and the produced carbon dioxide gas is introduced into a cultivation room such as a vinyl house or equivalent, accordingly, a concentration of the carbon dioxide gas in the atmosphere of the vinyl house is increased and a photosynthesis in the terrestrial plants is activated. Consequently, a yield and a quality of farm products and the like is improved.

However, the conventional method of directly supplying the terrestrial plants with the carbon dioxide gas involves following disadvantages. A large investment in equipment of an airtight cultivation room such as a vinyl house or equivalent is required. Also, the cultivation of plants in the cultivating room inevitably put restrictions on a cultivating area of plants. Further, the combustion of the fossil fuel to obtain the carbon dioxide gas un-desirably generates a large amount of nitrogen oxide and sulphur oxide which exert a harmful influence on the growth of the plants and a worker. In addition, there may be a case where incomplete combustion of the fossil fuel generates black smoke which may adhere to the plants and the vinyl house, so that an amount of light reaching the plants is reduce. Furthermore, attention must be paid to the control of temperature of the cultivation room since the heat resulting from the combustion of the fossil fuel causes increasing temperature of the cultivation room. Besides, ventilation causes the carbon dioxide gas to simultaneously escape from the cultivation room, so that a reduction in the supply efficiency is caused.

SUMMARY OF THE INVENTION

Accordingly, it is an object of the present invention to provide a method of enabling the growth of terrestrial plants such as farm products to be encouraged and accelerated with no request of an airtight cultivation room, with no harmful influence exerted on the growth of the terrestrial plants and a worker and at low cost, so that improved yield and quality of the terrestrial plants are provided.

It is another object of the present invention to provide an apparatus for enabling a large amount of a solution to be supplied to lots of terrestrial plants with high stability and over a long period of time.

To achieve the objects described above, a method of supplying a solution for raising terrestrial plants according to the invention comprises (a) a first step of producing a solution by an electrolysis of a water using carbonaceous electrode for an anode at least of the anode and a cathode, (b) a second step of supplying leaves of each terrestrial plant with the produced solution.

Preferably, in the second step, the solution reduced to minute particles or fine spray is sprayed on the entire terrestrial plant including the leaves.

Also, it is desirable that the carbonaceous electrode is a molded member produced by molding a composition of carbonaceous materials and cured resins into a plate-like form.

Further, it is preferable that a pair of molded members are comprised as the anode and the cathode, which are produced by molding a composition of carbonaceous materials and cured resins into plate-like forms, which confront each other, at least one of which is disposed obliquely so that an interval between the molded members can be gradually diminished, and each of which is selectively switched in polarity between the anode and the cathode in its use. Advantageously, the carbonaceous material is graphite.

Further, an apparatus for supplying a solution for raising terrestrial plants according to the invention comprises (a) a container for storing water, the container having a water inlet and a water outlet, (b) a pair of electrodes comprising an anode and a cathode provided in the container, at least the anode being made of carbonaceous materials, (c) a power supply to supply an electric current between the pair of electrodes to produce a solution by an electrolysis of the water and (d) a pump connected with the water outlet in the container for supplying the terrestrial plants with the produced solution.

Preferably, the carbonaceous electrode is a molded member produced by molding a composition of carbonaceous materials of 50–90% by mass and cured resins of 10–50% by mass into a plate-like form.

Further, it is desirable that the pair of electrodes comprise the molded members which are molded into plate-like forms, which are disposed so as to confront each other, each which has one end connected with a current introducing portion and which are disposed so that an interval between the molded members can be gradually diminished as a distance from the current introducing portion increases.

Also, it is preferably that the pair of electrodes are the molded members each produced by molding a composition of carbonaceous materials and cured resins into a plate-like form and a polarity switching means for selectively switching the polarity of the pair of electrodes are provided. In addition, it is desirable that the apparatus further comprises a stabilization device for enabling a control over the electric current supplied from the power supply to the pair of electrodes to be switched from a constant current control to a constant voltage control.

Further, an apparatus for supplying a solution for raising terrestrial plants according to the invention may comprises (a) a container for storing water, the container having a water inlet and a water outlet, (b) a pair of electrodes comprising an anode and a cathode provided in the container, at least the anode being made of carbonaceous materials, (c) a power supply to supply an electric current between the pair of electrodes to produce a solution by an electrolysis of the water, (d) a water level sensor for detecting a water level of the container, (e) a first valve for regulating an amount of a water to be supplied to the water inlet in cooperation with operations of the water level sensor, (f) a pump for transporting the solution stored in the container and (g) a second valve for regulating an amount of the solution transported by the pump.

Preferably, the apparatus further comprises an on-off control portion for allowing the supply of the electric current from the power supply to the pair of electrodes to be automatically switched on and off. It is desirable that the apparatus further comprises a piping which extends from the pump and which has a tip end connected with an implement for reducing the transported solution to minute particles or fine spray.

BRIEF DESCRIPTION OF THE DRAWINGS

The invention will now be described with reference to the accompanying drawings wherein.

DETAILED DESCRIPTION OF THE PREFERRED EMBODIMENT

Referring now to the accompanying drawing figures, an example of the preferred embodiment of the invention is described below. However, it is to be understood that the scope of the invention is by no means limited to the illustrated embodiment.

Figure 1:
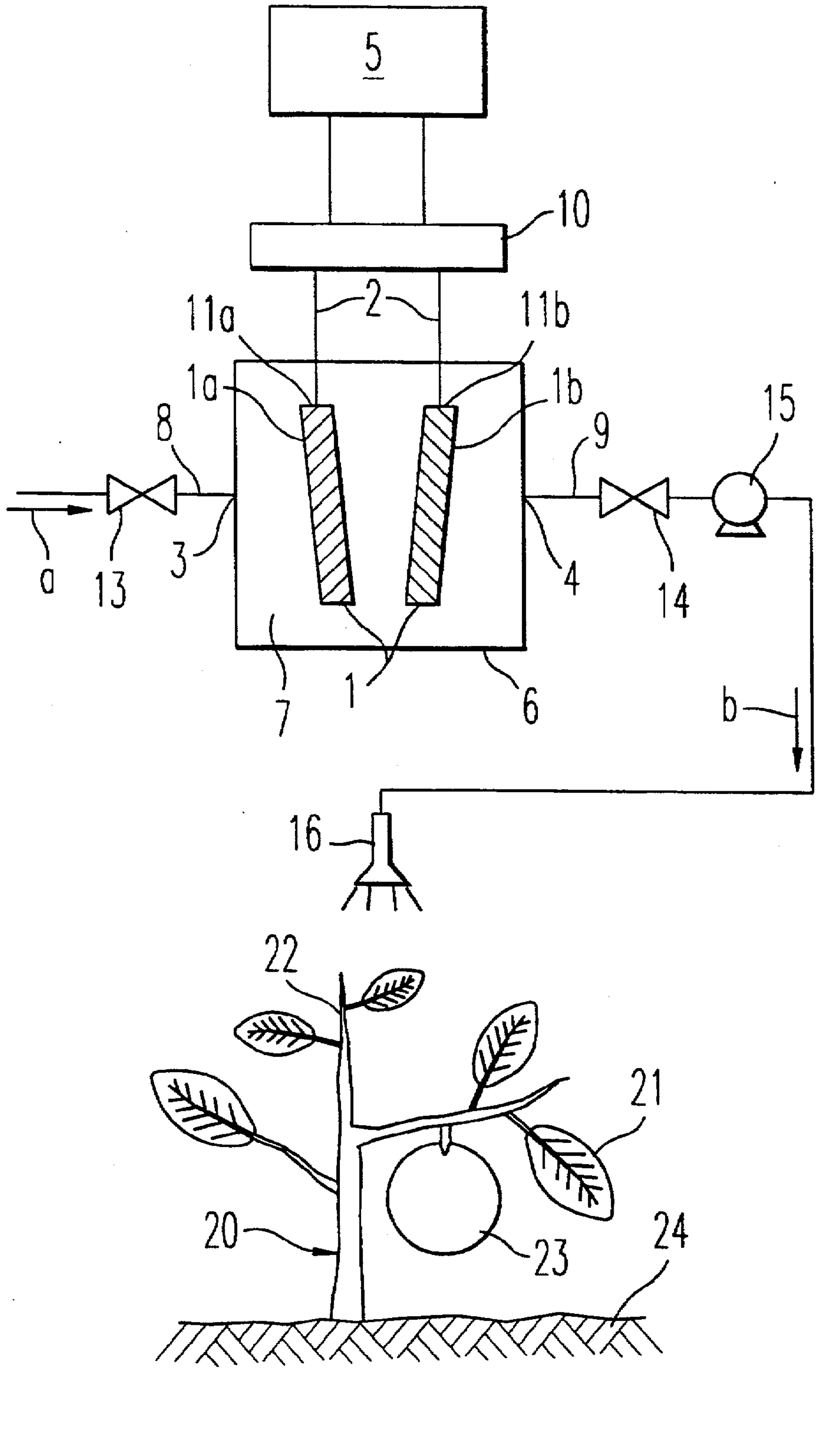
FIG. 1 is a schematic illustration of a constitutional example of the apparatus for supplying a solution according to the invention.

Referring to FIG. 1, a water is fed at a water inlet 3 into a container 6 to be stored therein and is electrolyzed employing carbonaceous materials for at least an anode 1*a* of the anode 1*a* and a cathode 1*b*. In the electrolysis of a water, plant promotion substances are yielded at the anode 1*a* and are soon dissolved in the water, thereby a solution of the plant promotion substances are produced.

The obtained solution is taken out from a water outlet 4 to be supplied to terrestrial plants.

It is presumed that the main substance dissolved in the solution is a carbon dioxide gas. The solution of the carbon dioxide may be obtained by any known methods, e.g., one method for dissolving the carbon dioxide into the water, in which the carbon dioxide is brought into contact with water together with a dry ice or materials which generate carbon dioxide by contact with water, or anther method for dissolving the carbon dioxide into the water, in which a carbon dioxide gas obtained by combustion of fossil fuel or the like or a carbon dioxide gas filled in a gas cylinder is introduced into a water tank so as to be bubbled in the water. However, the method for dissolving the carbon dioxide into the water, in which water is electrolyzed using carbonaceous electrode and the resulting carbon dioxide is dissolved in the water, is the best in terms of dissolving efficiency, cost efficiency, practicability on an industrial scale, soundness for plants and the like.

Also, it is presumed that some other substances are dissolved therein such as oxygen and chemically stable plant promotion substances which are produced by the carbonaceous electrode though it is presumed that the main substance dissolved in the solution is a carbon dioxide gas. Because an increase in growth of the plant of the example as will be described later defies a simple explanation only grounded on the supply of carbon dioxide. In other words, it is important that a solution is what is produced by an electrolysis of a water using carbonaceous electrode for an anode at least of the anode and a cathode rather than a solution of a carbon dioxide. In addition, it is important to supplying leaves of each terrestrial plant with the produced solution as described below. These steps are important for growing terrestrial plants, which are a first step of producing a solution by an electrolysis of a water using carbonaceous electrode and a second step of supplying leaves of each terrestrial plant with the produced solution.

The solution may be reduced to droplet or fine spray or fog by any known methods or means, e.g. a sprayer such as a spray, a fine sprayer such as a fine spray nozzle, a sprinkler, a watering pot and the like in order to be applied on leaves of a plant or on the entire plant. Any application methods or means will do. A particularly effective application means is a foliar spray, most preferably, which sprays partially on leaves on their back side area on which there are almost all stomata. There is no particular limitation to an amount of the solution to be applied or sprayed though it is commonly enough to spray the solution as much as a leaf surface gets wet with the applied solution. Also, there is no particular limitation to a time zone for the application of the solution, but it is more effective to apply or spray the solution in the time zone suitable for reaction of photosynthesis, in other words, in the time zone in which photosynthesis is made at an increased rate.

When the solution of the plant promotion substances is sprayed on leaves, approximately 30 percent of the carbon dioxide in the solution is deaerated and converted into a gas at the instant of coming out of a sprayer or equivalent, thus enabling a concentration of the carbon dioxide gas to be increased in a desired space. Also, the solution adhering to leaves of a plant evaporates gradually at that place and converts into the carbon dioxide gas, thus enabling the concentration of the carbon dioxide to be increased in the neighborhood of the leaves. Further, some plant promotion substances other than the carbon dioxide are also absorbed at the leaves and other portions of the plant. Therefore, an application of the solution to plants can be effected even in an open space without using a cultivation room such as a vinyl house or a green house.

Further, 75–85 percent of a humidity is normally suitable for photosynthesis. The spray or application of the solution can provide an increase of the humidity as well, so that the atmosphere suitable for the photosynthesis is easily created. It is presumed that a synergistic effect of the mentioned results in an achievement of the specific effects of the invention.

It is noted that applicable terrestrial plants are what assimilates the carbon dioxide by photosynthesis and then synthesizes organic substances such as starch and the like. Some examples of the applicable terrestrial plants are farm products such as fruits, leaf vegetables and root vegetables, ornamental plants such as ornamental flowers, leaves and fruits, fruit trees, planted trees and bonsai.

The details of the construction of the equipment of FIG. 1 is further described below. The anode 1*a* and the cathode 1*b* are molded members which are molded into flat plate-like forms. An upper end of each of the molded members forms an current introducing portion 11*a*, 11*b*. The current introducing portion 11*a*, 11*b* are connected to a power supply 5 through conductive wires 2 so that voltage can be applied to a pair of electrodes 1. Water 7 is usually flown into the container 6 at the water inlet 3 through a water supply passage 8 formed of a pipe.

The water in the container is electrolyzed through the pair of electrodes 1, thereby a solution of a plant promotion substances is produced. The obtained solution is fed to the terrestrial plants through a transporting passage 9 formed of a tube connected directly to the water outlet 4. The reference character a designates a direction of a flow of the water and the reference character b designates a direction of a flow of the solution of the plant promotion substances. In the apparatus of the invention, both anode 1*a* and cathode 1*b* of the pair of electrodes 1 are formed of carbonaceous electrodes molded into plate-like forms and a polarity switching means 10 for selectively switching the polarity of the electrodes is interposed between the pair of electrodes 1 and the power supply 5. Further, a stabilization device may be provided between the power supply 5 and the polarity switching means 10 if it is necessary. The stabilization device controls so as to supply a constant electric current to the pair of electrodes 1. Further, the stabilization device may be constructed so as to switch the constant current control to a constant voltage control in order to Judge the life of the electrodes 1 when voltage rises to a set value by a cause of a wastage of the electrodes 1.

The polarity switching means 10 can reverse the polarity of the anode 1*a* and the cathode 1*b* in order to remove substances adhering to the cathode 1*b*. When the water is subjected to electrolysis for a long time, calcium (Ca), magnesium (Mg) and the like existed in the water adhere to the cathode, so that a remarkable reduction is caused in a carbon dioxide dissolving efficiency. Particularly, when the carbonaceous electrode is used for the cathode as well as the anode 1*a*, adhesion of the adherents becomes even stronger than when a metal electrode of such as a stainless steel and the like is used for the cathode. If such adherents are physically removed from the electrodes, the electrodes can be damaged. Accordingly, the apparatus of the invention is constructed so that the carbonaceous electrodes can be applied to the anode 1*a* and the cathode 1*b* of the electrodes 1 and also can be associated with each other through the polarity switching means 10. This constructed apparatus enables the polarity of the anode 1*a* and the cathode 1*b* to be switched, so that the adherents are easily removed by switching the cathode to the anode. Further, each electrode in the pair can be used for dissolving plant promotion substances by means of switching the polarity.

The anode 1*a* and the cathode 1*b*, which are molded members each having a plate-like form, are arranged so that an interval between the molded members confronting each other may be gradually diminished as a distance from the current introducing portions 11*a*, 11*b* increases and so that current density between the pair of electrodes can be kept substantially constant. This arrangement allows both electrodes to decay uniformly, so that a longevity of the electrodes is achieved.

The electrical resistivity ρ of the carbonaceous electrode has a scale of $1\times10^{-8}\Omega\cdot cm$ and is substantially larger than that of metal electrode such as copper ($\rho=1.7\times10^{-8}\Omega\cdot cm$) or iron ($\rho=9.7\times10^{-5}\Omega\cdot cm$). Thus, ohm loss in the carbonaceous electrode increases as compared with the metal electrode. An amount of a voltage drop in the electrodes increases significantly as the distance from the current introducing portions of the electrodes increases by reason of a resistance of the electrodes itself. This causes un-uniformity between the anode and the cathode concerning a current density. Due to this, if the anode and the cathode are arranged in parallel with each other, the electrodes will decay unevenly, so that it will be difficult to obtain long life of the electrodes. In particular, such a phenomenon is manifested conspicuously in the carbonaceous electrodes made of a composition of carbonaceous materials and cured resins because the ρ of the carbonaceous electrode is normally extraordinarily large as compared with that of metals. For this reason, the electrodes 1 confronting each other are arranged so that the interval of them may be gradually diminished as a distance from the current introducing portions 11*a*, 11*b* of the electrodes 1 increases, which consist of the molded members each having a plate-like form as the anode 1*a* and the cathode 1*b*. This enables the current density between the both electrodes to be uniform, wastages both of the electrodes also to be uniform and a long life of the electrodes to be achieved.

The container 6 is provided with a water surface sensor (not shown) for detecting water surface. The amount of water 7 fed to the container 6 is regulated by a solenoid valve 13 associated in operation with the water surface sensor. The produced solution of the plant promotion substances is taken from the water outlet 4 and delivered by the power of a pump 15 through a solenoid valve 14 for regulating the delivery amount of the water, and then supplied to a terrestrial plant 20 via an application instrument 16. The number 21 represents a leaf, the number 22 represents a stalk or a stem, and the number 23 represents a fruit. A control portion, not shown, is connected to the power supply 5 so that the power supply can be automatically switched on and off.

Further, operation of the carbonaceous electrode made of a composition of carbonaceous materials with cured resins will be detailed below.

A generally used carbon electrode is made of a graphite material which is obtained by means of mixing, molding, baking and graphitizating petroleum coke or coal coke as an aggregate and coal tar pitch or the like as a binder. When the electrode made of the graphite material is used as an anode for electrolysis of water, anodic oxidation occurs not only on the surface of the electrode but also in the pore of the graphite, so that a large amount of graphite particles begin to fall at an initial stage of the electrolysis of a water and turned the water inky. On the other hand, when the electrode made of vitreous carbon which is prepared from a thermosetting resin and has little pore is used as an anode for electrolysis of the water, an anodic oxidation like a pit-oxidation occurs and develops into peeling of the electrode and eventually into fracture of the electrode, so that the electrode is put out of action.

According to the invention, in order to provide an excellent carbonaceous electrode, the electrode comprises a composition of carbonaceous materials of 50–90% by mass and cured resins of 10–50% by mass. Most preferably, the carbonaceous electrode is used in the form of a molded member produced by means of molding a composition of carbonaceous materials of 70–90% by mass and cured resins of 10–30% by mass into a flat plate-like form.

The carbonaceous materials used for forming the electrode include a substance substantially consisting of the carbon or containing the carbon as a main component. There are examples of the carbonaceous materials such as various kinds of natural or artificial graphite powder; various kinds of carbon black such as thermal black, furnace black, lamp black, channel black and the like; various kinds of active carbon; various kinds of mesophase carbon such as mesocarbon-micro-bead, bulk mesophase and the like; and various kinds of green or calcined coke of petroleum or coal, which consist of a natural or artificial allotrope of the carbon, the graphite and the like.

In addition, the cured resins include a cured or cross-linked thermosetting resin such as fran resin, polyimide resin, polyamide resin, polyester resin, epoxy resin and the like; and a cured or cross-linked thermoplastic resin such as polyethylene resin, polypropylene resin, polystyrene resin, polyvinylidene chloride resin and the like. Among others, it is preferable to employ phenol resin, fluoroplastic or the like having excellent resistance to a solution and chemicals.

The carbonaceous electrode may be produced in the following steps. For example, powder of the carbonaceous materials and powder of the resins are dispersed and mixed uniformly. Then, the mixture is packed in a mold and then is heated and pressed into a form by hot pressing and the like. Then, the molded resin is cured. At this time, the molded resin should be cured as completely as possible. Further, though there is no particular limitation on the shape of the electrode, it is preferable to mold the resin into a plate-like form for long life and improving a dissolving efficiency.

Further, there is no particular limitation in the method of producing a solution through the carbonaceous electrode. The solution may be produced by applying voltage to the both electrodes for electrolysis of a water. The voltage required for the electrolysis of the water cannot be uniquely determined because it depends on the interval between the electrodes, the content of impurity in the water and the like. For one information, the electrolysis of the water usually requires 5 V or more where the interval between the both electrodes is 5–10 mm and a potable water is employed. In the case of the carbonaceous electrode, it is preferable that the electrolysis of the water is performed under the condition that the current density determined by dividing a total current by a working surface area is not more than 10 $mA/cm^2$. The current density exceeding 10 $mA/cm^2$ could cause a surface of the electrode to be roughened, so that a deterioration in an electrolytic efficiency or a reduction in life may be caused. Further, the electrolysis of the water is usually carried out in the method in which the carbonaceous electrode is used for at least one electrode which will be an anode of the anode and the cathode, and a direct current is supplied between the electrodes which are in contact with the water. The metal electrode of a stainless steel or the like may be used for the other electrode which will be the cathode. Also, an alternating current may, of course, be used though the electrolytic efficiency will then decrease.

Further, there is no limitation on the water to be electrolyzed. For example, a potable water, an underground water, a well water or an industrial water may be used. The water should be electrolyzed at a temperature as low as possible in order to reduce dissipation of the carbon dioxide from the solution of the plant promotion substances. It is normally enough that the water is electrolyzed at 1–30° C. In addition, the obtained solution may be supplied to he plants after passed through a means for dissolving some additional plant raising substances such as fertilizers, agricultural chemicals and the like into the obtained solution.

Further, the carbon dioxide is used for concentration control of the solution since, it is presumed, the carbon dioxide is a main component dissolved in the solution to be supplied. A preferable concentration range of the solution is a range in which the content of the carbon dioxide is of 10–2000 mg/liter at room temperature. The reason therefor is as follows. The growth promotion effect by the carbon dioxide which is a substance soluble in the water is reduced when the concentration is less than 10 mg/liter. On the other hand, the carbon dioxide dissolved in the water dissociates and produces hydrogen ion ($CO_2+H_2O \rightarrow HCO_3^-+H^+$), so that the solution is made into weak acid. Accordingly, the pH value is reduced too much for the most of plants when the content of the carbon dioxide exceeds 2000 mg/liter. This is not good for the growth of the most of plants. An optimum concentration range of the solution is, in particular, the range in which the content of the carbon dioxide is of 30–500 mg/liter at room temperature. The pH value varies with a temporary hardness (KH) by a carbonate of the water and a concentration of carbon dioxide. When the KH is too low, the pH value changes radically even if a variation in the concentration of the carbon dioxide is slight and it is difficult for the carbon dioxide to be dissolved in the water. Therefore, an attention must be paid on this KH. In general, the KH is spontaneously in the range of 0–140° dH and any of the value is available. However, a substance serving increase of the KH such as a calcium carbonate may be added to the water so as to increase the KH and then dissolve more carbon dioxide gas since the KH Is in the proportional relationship to the concentration of the carbon dioxide gas able to be dissolved.

Next, details of the electrode containing carbonaceous materials will be described from three viewpoints which are an electrochemical characteristics of the electrode, a measurement of a quantity of the dissolved carbon dioxide and results of the polarity switching test. (Electrochemical Characteristics of the Electrode of the Invention)

Example 1 of the Manufacturing of Electrode:

60 parts by mass of natural graphite powder was added to 40 parts by mass of phenol resin under mixing and thereby 100 parts by total mass of mixture was obtained. The mixture was introduced into a mold preheated at 170–190° C. and had been molded on a hot platen under a heat of 180–190° C. and a pressure of 200 $kgf/cm^2$ for thirty minutes, and thereby a disc having a diameter of 120 mm and a thickness of 5 mm was obtained. Then, the disc had been heat-treated at 200° C. for five hours to cure the resin completely. Thereafter, a sample of 40×20×5(mm) was cut out from the disc so as to form a plate-like molded member. And, the electrochemical characteristics of the sample was examined in the cyclic voltammetry method.

For the examination, a tap water was filled in a container for an electrolysis, and a stainless steel of SUS316 was used for a cathode and a platinum was used for a reference electrode. An electric potential was swept at 10 mV/sec. A dipped part of the anode dipped in the solution had a size of 20×20×5(mm) and a working surface area was about 11 $cm^2$.

The same experimentation was made for a general graphite material and vitreous carbon.

The result showed that the produced material (the phenol-resin and natural-graphite molded member) containing 60 parts by mass of the natural graphite powder with respect to 40 parts by mass of the phenol resin were not substantially polarized by reason of an electric resistance of the resin, and that the produced material had substantially the same electrolysis characteristics as the general graphite material and the vitreous carbon.

Next, a constant-voltage-electrolysis was performed using the phenol-resin and natural-graphite molded member mentioned above as the anode and a silver and silver chloride electrode as the reference electrode in one normal solution of sodium perchlorate, in which electric potential of the anode was increased by 0.1 V in every twenty minutes from 1.5 V. The result was that even when the plate voltage exceeded 2.0 V and the quantity of electricity exceeded 3000 coulomb, only a very small amount of graphite particles fell. Thereafter, the quantity of electricity increased up to 4000 coulomb (plate voltage of 2.2 V), but no crack or broken was found in the electrode.

Comparative Example 1 of the Manufacturing of Electrode:

The same experimentation was conducted with various kinds of commercially available, isotropic graphite materials. The result was that when the quantity of electricity reached approximately 1500 coulomb (plate voltage of 1.7 V), large soaly pieces began to fall, and when exceeded 2000 coulomb, the fallen pieces were built up on the bottom of the container.

In the experimentation conducted with the vitreous carbon, the result was that when the quantity of electricity exceeded 700 coulomb (plate voltage of 1.9 V), the falling of particles occurred, and after the quantity of electricity increased up to 1000 coulomb, the breakage of the electrode was found at its edge portion and the solution in the container turned brown.

As mentioned above, it was proved from the results of the example 1 of the manufacturing of electrode and the comparative example 1 that the phenol-resin and natural-graphite molded member was excellent in the electrolysis characteristics and was able to maintain its soundness for a longer term as an electrode in comparison with the isotropic graphite materials or the vitreous carbon. It is noted that all the electrolysis above have been done under the condition of current density being less than 10 $mA/cm^2$.

(Measurement of a Quantity of the Dissolved Carbon Dioxide)

Figure 2:
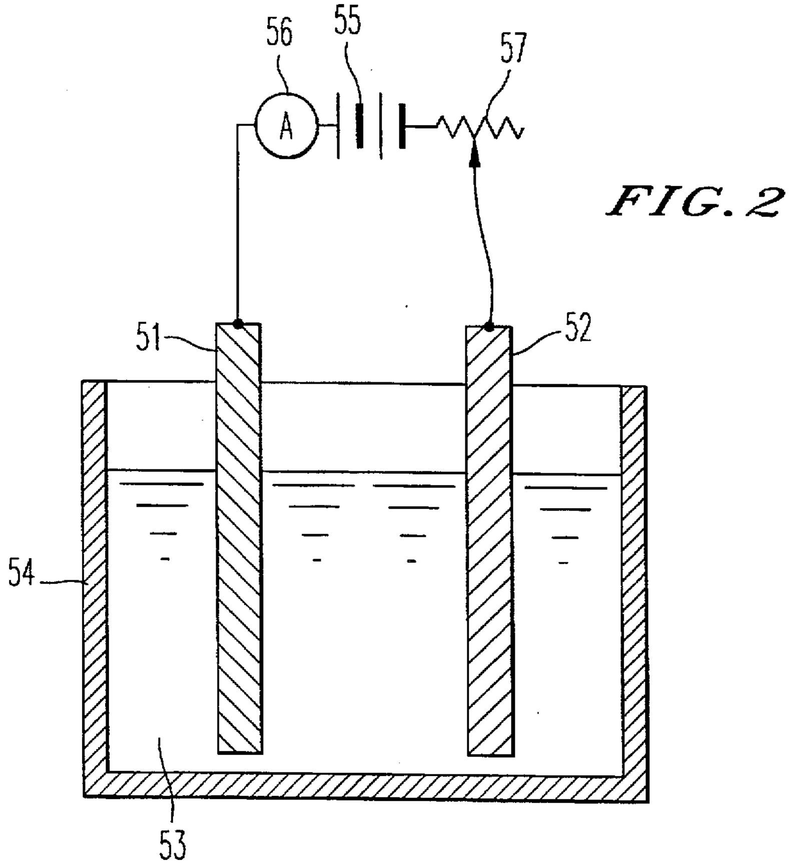
FIG. 2 is a schematic illustration of an electrolysis test of carbonaceous electrodes.

Test Example 1 of the Electrode:

Except for a change in the mixture ratio between the phenol resin and the natural graphite powder, the test sample was prepared in the same manufacturing method as in the Example 1 of the manufacturing of electrode described above, and resistivity of this prepared test sample was measured in the fall-of-potential method. Then, the water (tap water) 53 of room temperature is electrolyzed by an electric direct current of 50 mA (an ammeter 56) from an electric power supply 55 for one hour in an acrylic electric container 54 for an electrolysis as shown in FIG. 2 using the test sample as the anode plate 51 and stainless steel of SUS316 as the cathode 52. The quantity of the carbon dioxide dissolved in the water 53 was measured. The dipped part of the anode 51 dipped in the solution had a size of 20×20×5(mm) and the working surface area was about 11 $cm^2$ (current density of about 4.5 $mA/cm^2$). The carbon dioxide generated from the dipped part of the anode by means of the electrolysis of a water conducted under these conditions and was immediately dissolved in the water and then turned solution. At this point, a measurement of a quantity of the dissolved carbon dioxide was carried out as follows. A certain amount of barium hydroxide ($Ba(OH)_2$) was put into and dissolved in the electrolyzed water so that the carbon dioxide dissolved in the electrolyzed water (carbon dioxide turns carbonic acid when dissolved in the water) might be fixed as a barium carbonate ($BaCO_3$), and then the un-reacted $Ba(OH)_2$ was back-titrated with hydrochloric acid (HCl). The quantity of the carbon dioxide dissolved in the water was obtained from the value measured in the back-titration.

The carbon dioxide is produced in accordance with the following chemical formulas (C1) and (C2)

$$2H_2O \rightarrow 2(O)+4H+4e- \quad (C1)$$

$$C+2(O) \rightarrow CO_2 \quad (C2)$$

where (O) represents an atomic and active oxygen.

A theoretical quantity of carbon dioxide produced is 10.45 ml as is calculated from the following equation (E1) under the conditions of 50 mA and one hour.

$$[(0.05\times3600)/(96500\times4)]\times22400=10.45(ml) \quad (E1)$$

The percentage of the actual quantity of carbon dioxide dissolved in the water to the theoretical quantity is defined as a dissolving efficiency of carbon dioxide.

Figure 3:
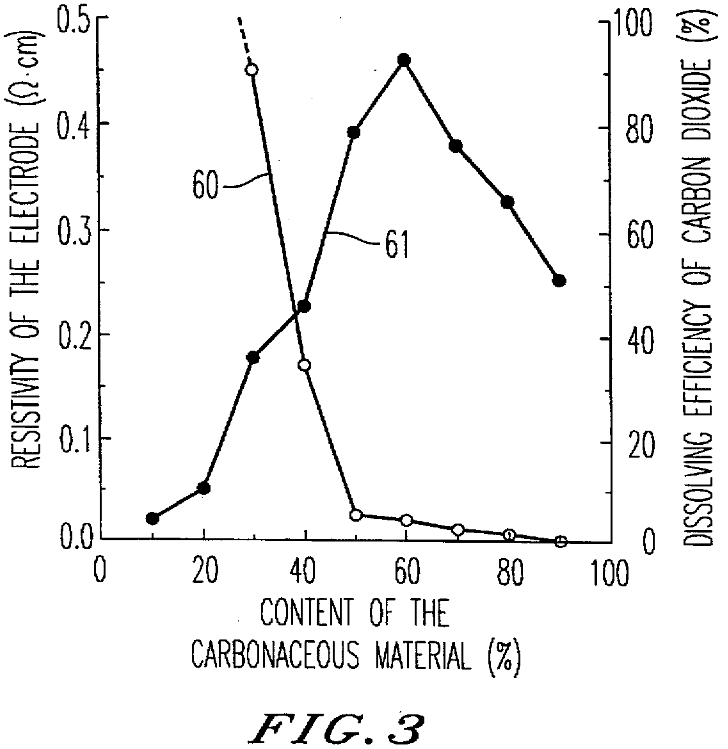
FIG. 3 a graph showing a relationship among content of carbonaceous materials, resistivity of the electrode and dissolving efficiency of carbon dioxide.

Illustrated in FIG. 3 is the relationship among the content of the carbonaceous materials, the resistivity of the electrode and the dissolving efficiency of the carbon dioxide. In FIG. 3, a line 60 shows a variation in the resistivity and a line 61 shows a variation in the dissolving efficiency of the carbon dioxide.

It will be seen from FIG. 3 that when the content of the carbonaceous materials exceeds 50 percent by mass, the resistivity decreases suddenly, and the dissolving efficiency of carbon dioxide increases significantly. It is noted in particular that this phenomenon is caused significantly in the specific range of the carbonaceous materials of 50–80 percent by mass, in other words, in the specific range of the cured resins of 20–50 percent by mass. On the other hand, the cured resins less than 10 percent by mass will provide substantially the same results as in the isotropic graphite materials or the vitreous carbon and make it difficult to maintain soundness of an electrode for a long time.

This indicates that it is desirable for the apparatus of the invention to use the carbonaceous electrode comprising a component of the carbonaceous materials of 50 through 90 percent by mass and the cured resins of 10 through 50 percent by mass. It is most preferable to use the carbonaceous electrode comprising a component of the carbonaceous materials of 50 through 80 percent by mass and the cured resins of 20 through 50 percent by mass.

It is noted that a reason why a dissolving efficiency of the carbon dioxide decreases at the content of the carbonaceous materials of less than 50 percent by mass may be a lesser producing carbon dioxide rather than a lesser dissolving carbon dioxide in the water.

(Results of the Polarity Switching Test)

A tap water was electrolyzed with no change in polarity by use of the apparatus of the invention including the electrodes comprising the cathode and the anode both being composed of the carbonaceous electrode. A little while later, the compounds such as Ca, Mg, and others began to adhere to the cathode so as to cover the surface of the cathode and the electrolytic voltage began to increase. The electric current began to decrease as the electrolytic voltage increased. In contrast to this, when the water was electrolyzed with switching polarity every two hours, a phenomenon such as above did not occur and accordingly the solution of the plant promotion substances was able to be produced satisfactorily.

Further, the spray test result of the solution in which the plant promotion substances were dissolved by the electrolysis of the water using the carbonaceous electrode as mentioned above is described below.

The spray test was carried out for two months from June 1 to July 31 in a fig orchard in Nishi-Sanuki area of Kagawa Prefecture in Japan. The solution of the plant promotion substances in concentration of 150 mg/liter was reduced into droplets with a sprayer and was applied to leaf surfaces of fig trees by ten liter per tree at seven o'clock every morning. And, those sprayed trees (Example) were compared with other trees (Comparative example). It is noted that the solution of the plant promotion substances employed in the Example has been produced by electrolyzing an underground water (at KH of 6 dH) through the carbonaceous electrode. The test results are shown below.

(Tree Vigour)

The trees of the example grew better than the trees of the comparative example with respect to a thickness of a leaf and a diameter of a stalk.

(Date of Maturity)

10 days earlier harvest of fruits was realized in the example than in the comparative example.

(Degree of Sugar)

The degree of sugar of sarcocarp of the comparative example was of 18, whereas that of the example was of 22. Thus, the increase in degree of sugar was confirmed. The degree of sugar was measured with a digital degree-of-sugar measuring device (made by a Japanese Corporation, ATAGO K.K.).

(Yield)

The yield of fruits of the example increased by about 20 percent (on a total weight ratio) as compared with that of the comparative example.

The test results as mentioned above showed that better effects were provided in the example in every respect of the tree vigour, the date of maturity, the degree of sugar and the yield. It was demonstrated that the effects were achieved by the supply of the solution resulted from the electrolysis conducted through the carbonaceous electrode.

What is claimed is:

1. A method of supplying a solution for raising a terrestrial plant, (a) producing a solution containing carbon dioxide and other plant growth promoting substance(s), said other plant growth promoting substance(s) being formed by electrolysis of water using a carbonaceous electrode for an anode or a cathode, or both; and (b) applying the produced solution to leaves of the terrestrial plant; and wherein said carbon dioxide is present in said solution in an amount of about 30–500 mg/liter.

2. The method according to claim 1, wherein in step b), the solution is first reduced to minute particles or fine spray and then sprayed on the entire terrestrial plant.

3. The method according to claim 1, wherein the carbonaceous electrode is a molded member produced by molding a composition of carbonaceous materials and cured resins into a plate-like form.

4. The method according to claim 3, wherein the anode and the cathode comprise a pair of molded members produced by molding a composition of carbonaceous materials and cured resins into plate-like forms, the pair of molded members confront each other and are constructed so that at least one of the molded members is disposed obliquely so that an interval between the molded members can be gradually diminished and, each of the molded members is selectively switched in polarity between the anode and the cathode in its use.

5. The method according to claim 3 or 4, wherein the carbonaceous material is graphite.

6. An apparatus for supplying a solution for raising of a terrestrial plant, comprising:

(a) a container for storing water, the container having water inlet means and water outlet means, (b) a pair of electrodes comprising an anode and a cathode provided in the container, at least the anode being made of carbonaceous materials:

(c) a power supply to supply an electric current between the pair of electrodes to produce a solution containing carbon dioxide and other plant growth promoting substance(s), by electrolysis of the water; and (d) a pump connected with the water outlet in the container for supplying the terrestrial plants with the produced solution.

7. The apparatus according to claim 6, wherein the carbonaceous electrode is a molded member produced by molding a composition of carbonaceous materials of 50–90% by mass and cured resins of 10–50% by mass into a plate-like form.

8. The apparatus according to claim 7, wherein the pair of electrodes comprise the molded members which are molded into plate-like forms and are disposed so as to confront each other, each of the molded members has one end connected with a current introducing portion, and the molded members are disposed so that an interval between the molded members can be gradually diminished as a distance from the current introducing portion increases.

9. The apparatus according to claim 8, further comprising a polarity switching means for selectively switching the polarity of the pair of electrodes, wherein the pair of electrodes are the molded members produced by molding a composition of carbonaceous materials and cured resins into plate-like forms.

10. The apparatus according to claim 9, further comprising a stabilization device for enabling the electric current supplied from the power supply to the pair of electrodes to be switched from a constant current control to a constant voltage control.

11. An apparatus for supplying a solution for raising terrestial plants, comprising:

a) a container for storing water, the container having a water inlet means and a water outlet means;

b) a pair of electrodes comprising an anode and a cathode provided in the container, at least the anode being made of carbonaceous materials;

c) a power supply to supply electric current between the pair of electrodes to produce a solution containing carbon dioxide and other plant growth promoting substance(s) formed by electrolysis of water;

d) a water level sensor for detecting a water level of the container;

e) a first valve for regulating an amount of water to be supplied to the water inlet in co-operation with the water level sensor;

f) a pump for transporting the solution stored in the container; and g) a second valve for regulating an amount of the solution transported by the pump.

12. The apparatus according to claim 11, further comprising an on-off control portion for allowing the electric current supplied from the power supply to the pair of electrodes to be automatically switched on and off.

13. The apparatus according to claim 11, further comprising a piping extending from the pump, the piping having a tip end connected with an implement for reducing the transported solution to minute particles or fine spray.

14. The apparatus according to claim 11, wherein the carbonaceous electrode is a molded member produced by molding a composition of carbonaceous materials of 50–90% by mass and cured resins of 10–50% by mass into a plate-shaped form.

15. The apparatus according to claim 14, wherein the pair of electrodes comprise the molded members which are molded into plate-shaped forms and are disposed so as to confront each other, each of the molded members has one end connected with a current introducing portion, and the molded members are disposed so that an interval between the molded members can be gradually diminished as a distance from the current introducing portion increases.

* * * * *